Nov. 5, 1935.　　　　　L. L. S. NELSON　　　　　2,019,867
AIR FILTER
Filed July 21, 1933
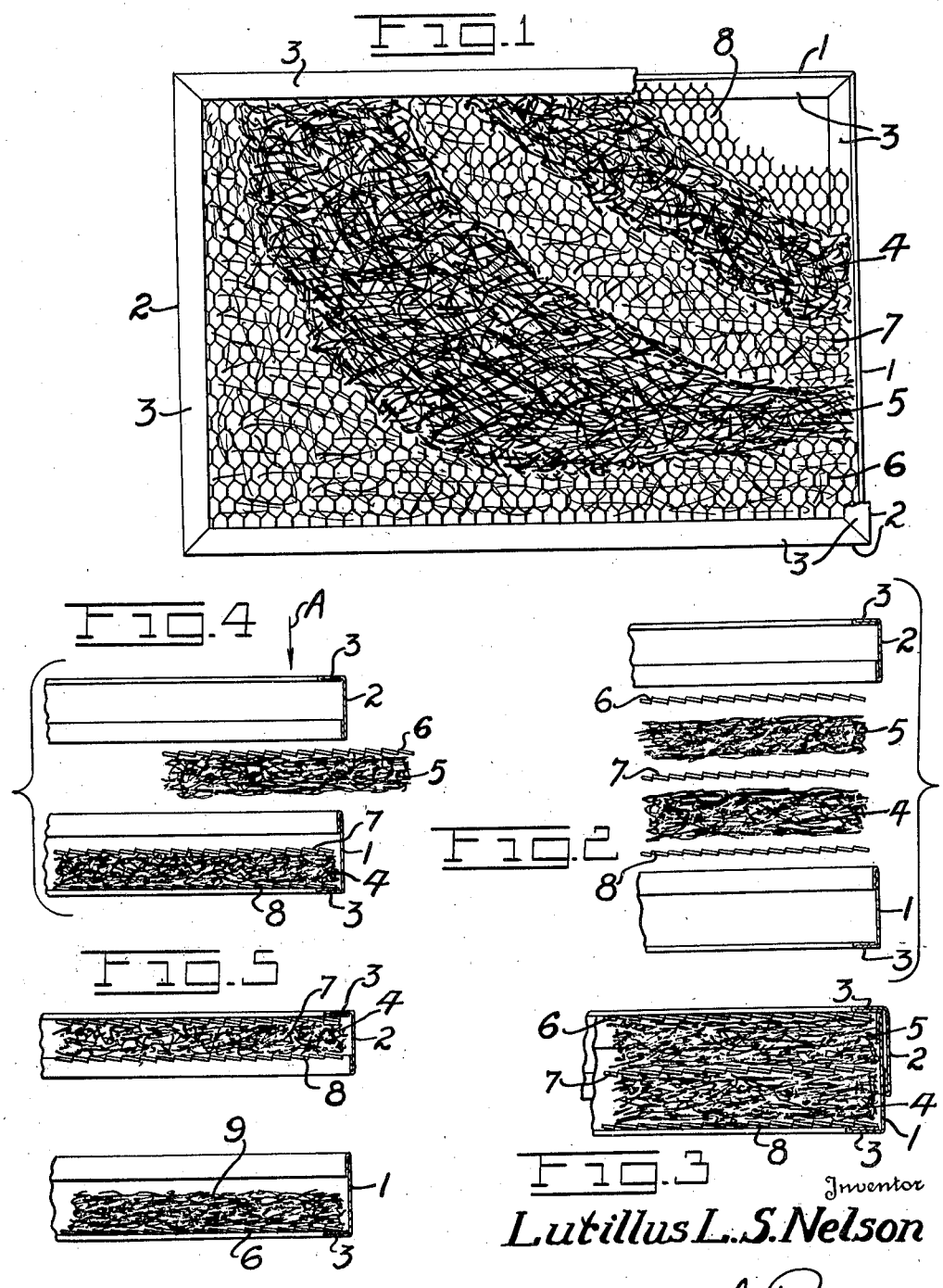
Inventor
*Lutillus L. S. Nelson*
By *Charles L. Reynolds*
Attorney Patented Nov. 5, 1935

2,019,867

UNITED STATES PATENT OFFICE 2,019,867

AIR FILTER

Lutillus L. S. Nelson, Seattle, Wash.

Application July 21, 1933, Serial No. 681,520

3 Claims. (Cl. 183—46)

My invention relates to air filters of the type used in heating and ventilating installations to filter dust from the air which is circulated through the air conduits. Since such installations are well known in conjunction with furnaces and air conditioning systems I do not deem it necessary to illustrate nor describe the system.

Such filters in a short time accumulate a mass of dust which, if permitted to accumulate too long, plugs up the filter or passes through interstices in the filtering material and is carried into the fresh air stream to circulate again through the house, and cuts down materially the efficiency and increases the cost of operation of the air circulating system. For this reason it is usually recommended that the filter be changed about once a month, or more frequently. However, it is found that the accumulation occurs largely on the surface of the filter which is exposed to the entering air, and the dust does not appear to accumulate to any great depth within the filter, yet in view of the necessity of intercepting substantially all the dust it is necessary to have a filter which is of appreciable depth, perhaps two inches. Accordingly, when the filter is removed and disposed of, as is customary, it entails a considerable loss to throw away the entire mass of filtering material, and this cost, where four or six filters are employed, or even where there are but one or two filters, is so great in the aggregate that there results the tendency to retain the filter as long as possible, longer than is desirable from the filtering standpoint and from the standpoint of efficiency of operation of the system.

Furthermore, such filters have usually been so formed, either in such a way that the entire filter must be taken out and thrown away, or that preformed masses of filtering material must be put in place, that the cost of renewing the filters has been a considerable item in the cost of operating the air filtering system.

Accordingly it is an object of my invention to provide a filter and a filtering agent which is exceedingly inexpensive, yet thoroughly efficient, and especially to provide a filter wherein it is not necessary to throw away the entire mass of filtering material, but in which it is possible to remove that portion of the mass which has become impregnated with the dust, and to retain that portion which has been but slightly or not at all affected by the dust, using this portion again, and supplying a fresh mass of the inexpensive filtering material, which can be supplied in bulk or in pads and easily applied within the frame of the filter, and thus it is my object to radically reduce the cost of renewing the filter, making it practicable to do this more frequently and to maintain at a higher level the efficiency of the system as a whole.

My invention will be better understood from a study of the following specification, which together with the drawing discloses my invention in a form which is at present preferred by me, and by a study of the attached claims, wherein the essentials of my invention are defined.

Figure 1 is an elevation of my filter, with parts broken back to show the several layers constituting the same.

Figure 2 is an exploded sectional view of the elements constituting my filter, and Figure 3 is a sectional view of the same assembled, ready for use.

Figure 4 is a sectional view showing, in conjunction with Figure 5, which is a similar view, the manner of renewing the filtering material.

Various substances have been used as the filtering material in such filters. Spun glass has been proposed, but this offers something of a problem in its disposal when dirty, and particularly offers a problem in connection with its handling, for the fine strands of glass frequently prick the hands of the workman, and being loaded with dust and germs, are very likely to start infection. The spun glass, moreover, is relatively expensive for such uses, where it must be disposed of at approximately monthly intervals. Grass has also been proposed, but the collection and curing of this grass is comparatively expensive. I have found common wood excelsior to be an excellent filtering material, especially when the same is impregnated with an oily substance, and as an example of such an impregnating substance I prefer petrolatum, since it does not give off an odor when used in conjunction with air handling systems. The excelsior is extremely cheap, easy to handle and to spread in the filter, and of course when it is to be disposed of, the excelsior, especially aided by the petrolatum, will burn rapidly and completely.

Preferably the filter as a whole is formed of two frames, 1 and 2, arranged preferably to telescope relative to one another in the same manner as the body and cover of a box, to form an enclosure open at the opposite faces. They may be frictionally held together, or in any suitable manner. To limit the movement of the two members toward each other, and for a purpose which will appear hereafter, I prefer that each of these telescoping members 1 and 2 be provided with inwardly directed marginal flanges 3. Thus the opposite faces of the enclosure are completely free and clear, except for the slight extent of the marginal flanges 3. The form of the frames may be anything found suitable to the installation with which it is to be used, though normally they would be made rectangular. They are normally, though not essentially, made of metal, whereby they may be used and handled without injury to them.

When the two parts of the enclosure are fitted together the opposite sides are spaced a matter of approximately two inches, and this space is filled with the filtering material, for example a mass of excelsior. However, instead of completely filling this space with a single mass of excelsior or other filtering material, I prefer to employ two layers, and thus in Figure 3 there is seen a mass 4 of excelsior lying in the bottom of the frame member 1, and a second mass 5 lying within the frame member 2. To hold these masses within the enclosure, and to separate the masses 4 and 5 from each other, I employ screen members, preferably expanded metal lath, as indicated at 6, 7 and 8. The screens 6 and 8 close the openings in the respective frame members 2 and 1, and the screen 7 serves as a separator for the two masses 4 and 5 of excelsior. The outer screens 6 and 8 are restrained by the marginal flanges 3 previously referred to.

Let us assume that the air movement has been in the direction of the arrow A in Figure 4. The layer 5 of filtering material has become thoroughly impregnated with the dust, but the layer 4 is but slightly charged with dust. The halves of the enclosure are separated, as seen in Figure 4, and the impregnated layer 5 is removed, together with its supporting screen 6. The latter serves as a convenient means for handling the dust-laden mass 5. The layer 5 can then be burned or otherwise disposed of. There is left the layer 4 and the screens 7 and 8. The screen 7 is now moved up into the position formerly occupied by the screen 6, as shown in Figure 5, and the layer 4, with its screen 8, is moved up at the same time. Thus the layer 4 is not disturbed. Now a fresh layer 9 is placed in the frame member 1, the screen 6 having been placed in the frame member 1, and when the two members are put together there results a complete filter in which the filtering layer 4, which was formerly distant from the inlet side of the air, is now adjacent to the inlet side, and a completely new layer 9 has taken the place formerly occupied by the layer 4. By this method the filter may be renewed from time to time, and only half of the excelsior need be removed and thrown away. Furthermore, it is a simple job to spread a little excelsior in the bottom of the enclosure 1 to constitute the fresh layer, and this can be supplied in bulk, or in pads, thus cutting down the cost to a minimum, with the result that, the job being easily accomplished and costing but little, the filter will be renewed frequently, as is desirable.

What I claim as my invention is:

1. As a filter for air in heating or ventilating systems, in combination, a shallow enclosure formed of a plurality of separable parts open at the two opposite faces of greatest area, three screens, at least one of which is loosely received within said enclosure, each of a size to substantially close the open faces, one being disposed to close each of said open faces, and the third being loose and disposed intermediate the first two, and two masses of filtering material disposed at opposite sides of the intermediate screen and loosely filling the space between said intermediate screen and the two outer screens, and said material being maintained in position within and filling the enclosure solely by contact with such screens, regardless of the position of the latter, to filter air passing through such enclosure, said masses and screens being removable and displaceable within the enclosure upon separation of the parts thereof.

2. As a filter for air in heating or ventilating systems, in combination, a shallow enclosure formed of a plurality of separable parts open at the two opposite faces of greatest area, and of like cross-section between such faces, three screens each loosely received within such enclosure, each of a size to close the open faces, one being disposed to close each of said open faces, and the third being disposed intermediate the first two, means to retain said screens normally within the enclosure, and two amorphous masses of filamentary filtering material disposed at opposite sides of the intermediate screen, and said material being maintained in position within and loosely filling the space between said intermediate screen and the two outer screens solely by contact with such screens thereby maintaining the screens in positions within the enclosure, to filter air passing through such enclosure, said masses and screens being movable through the enclosure from one open face to the other, and removable therefrom, upon separation of the parts thereof.

3. The method of renovating filters of a heating or ventilating system, employing open-faced frames the faces of which are closed by loose outside screens, and which have a loose screen intermediate the two outside screens, between which screens are placed masses of excelsior impregnated with petrolatum or the like, which method comprises opening the frame, removing an outside screen and the adjacent excelsior mass, shifting the intermediate screen to an outside position in the frame, and the other outside screen to an intermediate position, moving the interposed excelsior mass with such screens, laying a fresh excelsior mass within the frame, replacing the theretofore removed outside screen, and closing the frame to hold the screens and excelsior masses.

LUTILLUS L. S. NELSON.